(12) United States Patent
Gonda

(10) Patent No.: US 6,458,019 B1
(45) Date of Patent: Oct. 1, 2002

(54) METHOD OF MANUFACTURING MAGNETIC HEAD

(75) Inventor: Kazuhisa Gonda, Chungnam (KR)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/811,949

(22) Filed: Mar. 19, 2001

(51) Int. Cl.$^7$ ................................................ B24B 1/00
(52) U.S. Cl. .............................. 451/41; 451/58; 451/63
(58) Field of Search ............................. 451/41, 57, 58, 451/63

(56) References Cited

FOREIGN PATENT DOCUMENTS

| JP | 7-210847 | 8/1995 |
|---|---|---|
| JP | 7-235015 | 9/1995 |
| JP | 8-235530 | 9/1996 |
| JP | 9-248758 | 9/1997 |
| JP | 10-105930 | 4/1998 |

Primary Examiner—Timothy V. Eley
(74) Attorney, Agent, or Firm—Greer, Burns & Crain, Ltd.

(57) ABSTRACT

A surface of a work piece, in which a plurality of magnetic head elements are formed on a substrate, is linearly ground. The surface is linearly ground by an outer circumferential face of a disk-shaped rotary grind stone. By the linear grind, linear grind traces are formed in the work piece. By selecting the direction of the grind traces, amount and direction of warping the work piece can be controlled. By making the direction of the grind traces parallel to a direction of cutting of the work piece to form a plurality of blocks, in each of which a plurality of magnetic head elements are arranged, stress in the blocks are released and the amount of warping of the blocks can be reduced.

10 Claims, 6 Drawing Sheets

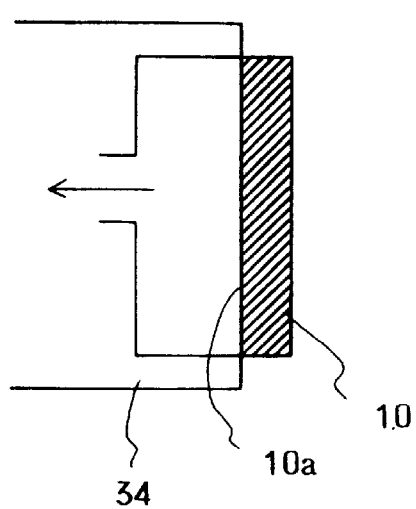
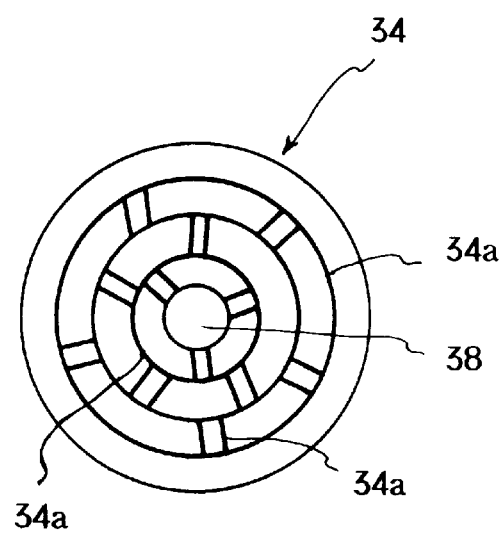

METHOD OF MANUFACTURING MAGNETIC HEAD

FIELD OF TECHNOLOGY

The present invention relates to a method of manufacturing a magnetic head for a magnetic disk drive unit, etc., and more precisely relates to a method of manufacturing a magnetic head, which is capable of preventing warping of a wafer during the wafer process and for preventing warping of slider blocks formed by cutting the wafer.

BACKGROUND TECHNOLOGY

In the steps of manufacturing magnetic heads, magnetic head elements are formed by forming films on a front surface of a wafer, then a rear surface of the wafer is ground so as to define a size of sliders. Successively, the wafer is cut to form a plurality of slider blocks, in each of which a plurality of the magnetic head elements are linearly arranged. Floating rails are respectively formed in cut faces of the slider blocks, followed with a plurality of sliders being formed by cutting each slider block.

FIG. 6 show a conventional method of grinding the rear surface of the wafer 10, in which the films have been formed on the front surface. FIG. 6A shows a section of the wafer 10 and a film face 10a. The original wafer 10 is a flat disk, but the front surface of the wafer, on which the films have been formed, is projected by stress in the films. Thus, the wafer 10 must be held parallel to a standard face of a chuck 12, and the rear surface of the wafer 10 is ground so as to correctly define the size.

The wafer 10 is held on the chuck 12 by mechanical means, such as vacuum means or an adhesive (e.g., wax). FIG. 7 shows the mechanical means in which the wafer 10 is held on the chuck 12 by chucking presses 13. FIG. 8 shows the vacuum means in which air is sucked toward a bottom side of the chuck 12 so as to hold the wafer 10, and an outer edge of the wafer is sealed by rubber members 14.

Even if the outer edge of the wafer 10 is held by the mechanical means or the vacuum means so as to be securely set in a grinding machine, a center part of the wafer 10, which has been set in the grinding machine, is sometimes warped. When the rear surface of the wafer 10 is ground, the wafer 10 is pressed onto a grinding face so as to straighten the warping of the wafer 10 as shown in FIG. 6B. However, the thickness of the center part of the wafer 10 is not equal to that of the outer edge thereof as shown in FIG. 6C if the warped wafer 10 is ground.

If the thickness of the wafer 10 is partially different, the size of the sliders disperses. As shown in FIG. 9, the sliders 16 are formed by cutting the slider block, which has been cut from the wafer 10, with regular separations so the size of the slider 16a, located in the center part of the wafer 10, is bigger than that of the slider 16b located in the outer edge.

On the other hand, in the case that the warping of the wafer 10 is straightened and the wafer is ground with uniform thickness, the films are formed on one side of the wafer 10, so imbalanced stress is left in the wafer 10 and the slider blocks must be warped after they are cut from the wafer 10.

In FIG. 10, the floating rails 20 are formed on a disk-side face of the slider block 18, which has been cut from the wafer 10. In FIG. 10A, the slider block 18 is warped, but in FIG. 10B, the slider block 18 is not warped. Since the floating rails 20, each of which has a prescribed pattern, are formed in the slider block 18, in the case of the warped slider block 18 shown in FIG. 10A, the floating rails 20 are shifted from predetermined positions so that the desired floating property cannot be realized.

In FIG. 11, a slope section 15 is formed at a corner of a disk-side face of the slider 16. When the slope section 15 is formed by abrading the corner of the slider block 18, if the slider block 18 is warped as shown in FIG. 11B, the size of the slope section 15 of the slider located at the center part of the slider block 18, is greater than that of the slope section 15 of the slider located at the outer edge.

The size of the conventional slider is about 4 mm, and these days the size of the slider for a small disk drive unit is about 1 mm. Therefore, because of the dispersion in the size of the sliders, the properties of the magnetic heads are influenced greatly.

An object of the present invention is to provide a method of manufacturing a magnetic head, wherein the warping of the wafer can be prevented. The wafer process and the step of forming the sliders from the wafer can be executed more precisely, and magnetic heads with higher quality and reliability can be manufactured.

DISCLOSURE OF THE INVENTION

In the present invention, the method of manufacturing a magnetic head includes the step of linearly grinding a surface of a wafer, in which a plurality of magnetic head elements are formed on a substrate. The surface of the wafer may be ground by an outer circumferential face of a disk-shaped rotary grind stone, and the width of the outer circumferential face of the disk-shaped rotary grind stone may be 10 mm or more. In this method, the amount and the direction of the warping of the work piece can be controlled, and a direction of grinding traces can be properly selected for further machining.

Further, the surface, which has been linearly ground, may be abraded in a circumferential direction, and this may be done by using a rotating face of a disk-shaped rotary grind stone. In this method, the entire wafer can be uniformly abraded, so that the warping of the work piece can be reduced.

Additionally, if the surface is ground in a direction parallel to a direction of cutting the wafer to form a plurality of blocks, and in each of which a plurality of magnetic head elements are arrange. As a result, stress in the wafer can be released, and the warping of the slider block can be reduced.

The method of the present invention can prevent the warping of the wafer during the wafer process or the step of grinding the wafer. As a result, the present invention improves manufacturing accuracy of the magnetic head, form patterns with higher accuracy, and stabilize the making of shapes and quality of the sliders. Consequently, high quality magnetic heads can be manufactured more stably.

BRIEF DESCRIPTION OF THE DRAWINGS

FIG. 5A is a sectional view of a wafer chucking unit;

FIG. 5B is a front view of the wafer chucking unit;

EMBODIMENTS

The present invention will now be explained in detail with reference to the accompanying drawings.

In the present embodiment, magnetizable films, etc. are formed on a front surface of a wafer 10 by wafer process, then a rear surface of the wafer 10 is ground by a surface grinding machine.

Figure 1:
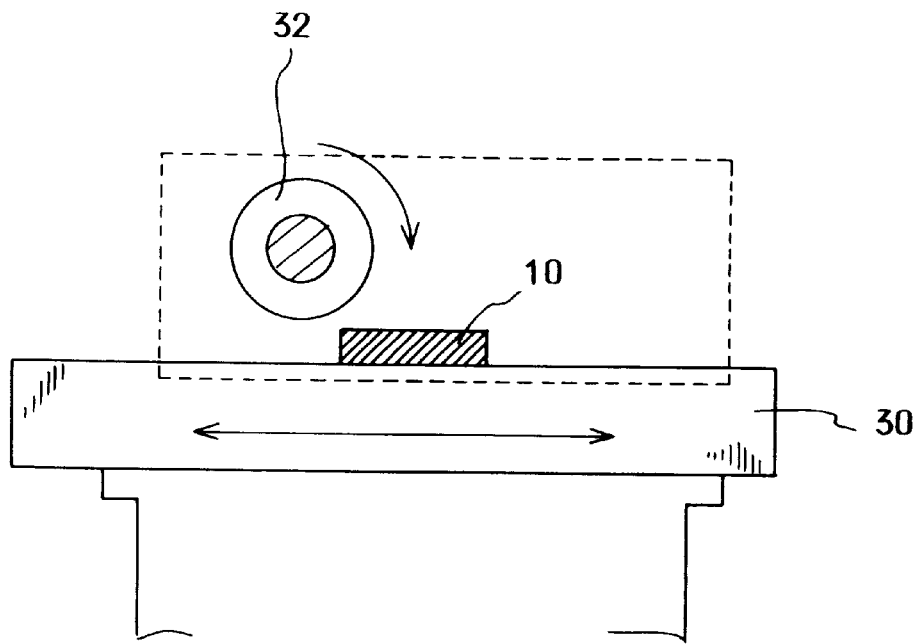
FIG. 1 shows a surface machine.

FIG. 1 shows a method of grinding the rear surface of the wafer 10 (work piece). In the method, the wafer 10 is adhered with wax, upon a movable stage 30, which is capable of linearly and reciprocally moving to make the rear surface face upward, then the wafer 10 is linearly ground by a rotary grind stone 32.

Figure 2:
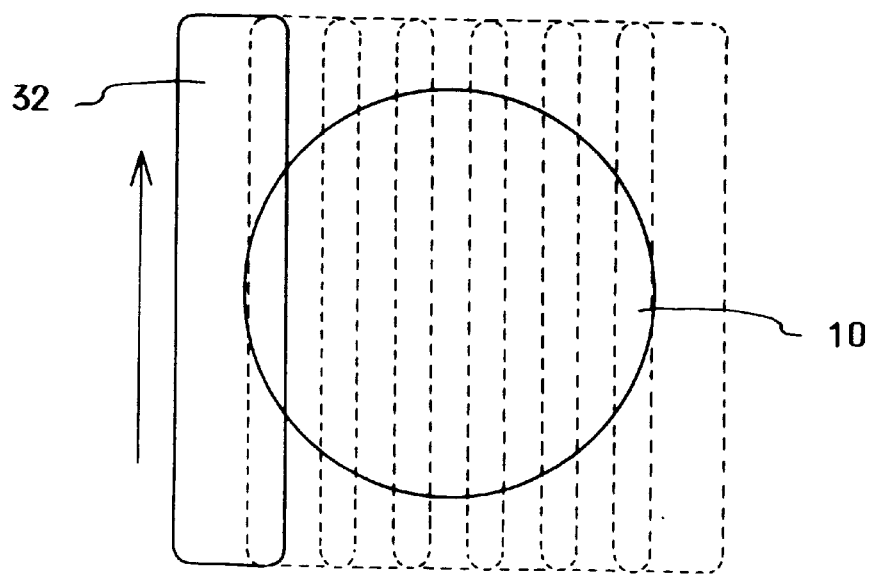
FIG. 2 shows a method of grinding a wafer with a rotary grind stone.

The rotary grind stone 32 is rotated in one direction only, and the relative moving directions of the rotary grind stone 32 with respect to the wafer 10 are defined by moving directions of the movable stage 30. As shown in FIG. 2, the rotary grind stone 32 is linearly and sidewardly moved with the same pitches, so as to grind the whole surface of the wafer 10, and its tracks are also partially overlapped.

Figure 3:
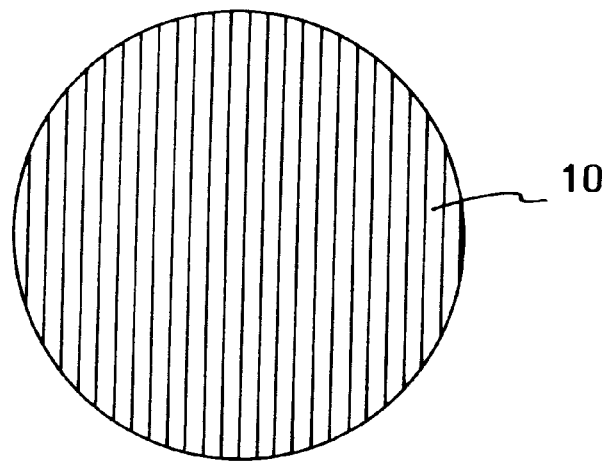
FIG. 3 shows the wafer on which the grind traces are formed.

By linearly moving the rotary grind stone 32 with respect to the wafer 10, the linear grind traces are marked in the rear surface of the wafer 10, as shown in FIG. 3.

An object of grinding the wafer 10 is to adjust thickness of the wafer 10 and to make the rear surface of the wafer 10 rough by rough grinding. By roughly grinding the surface, the grinding time can be shortened. Also, by making the rear surface of the wafer 10 rough, the stress between a film face 10a and the rear surface of the wafer 10 can be controlled.

In the present embodiment, the wafer was made of $Al_2O_3.TiC$, and preferably with a diameter of 5 inches and thickness of 2 mm. The rotary grind stone, on the other hand, preferably has a diameter of 250 mm and a width of 10–40 mm, and it is included with diamond grains having diameters of 4–60 $\mu$m. The rotary grind stone is rotated at rotational speed of 3,000 rpm, and the wafer 10 moves perpendicularly to an orientation flat so as to grind the wafer 10 until the thickness reaches 1.28 mm. Thus, the amount of grinding is 0.72 mm.

Figure 4:
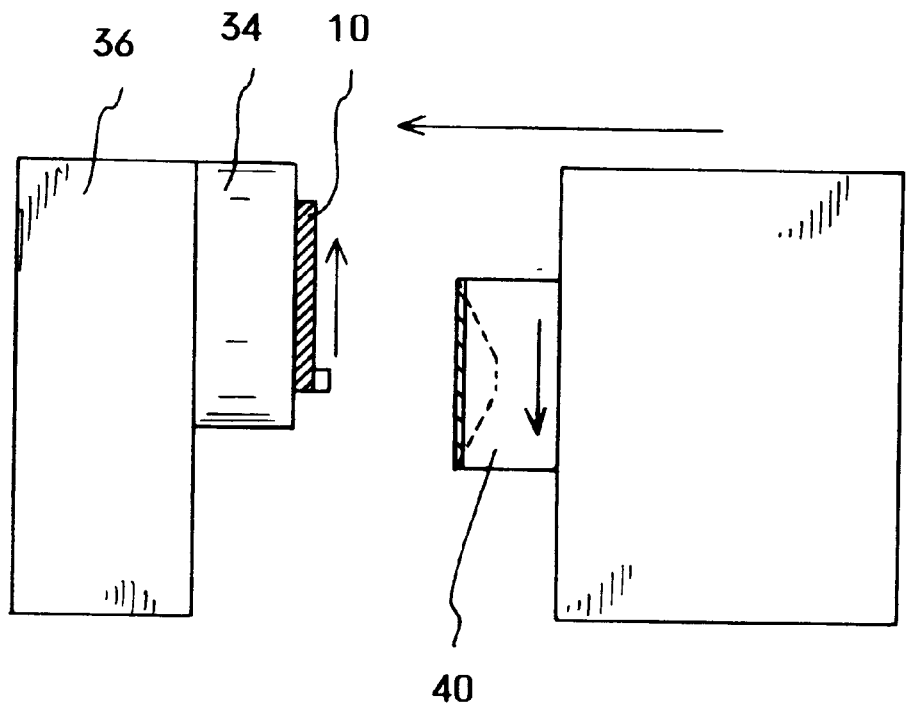
FIG. 4 shows a rotary grinding machine.
Figure 6A:
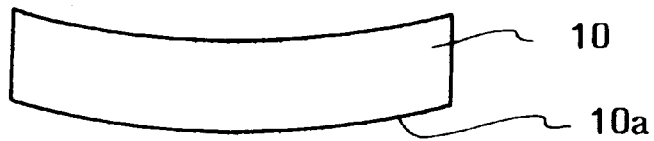
FIGS. 6A, 6B and 6C show the conventional method of grinding the rear surface of the wafer.
Figure 6B:
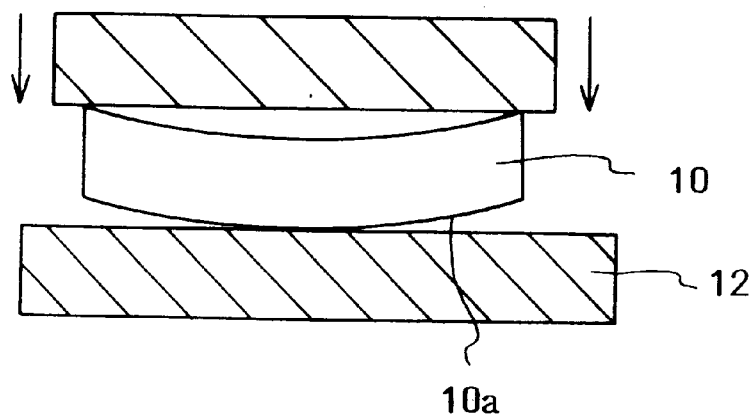
Figure 6C:
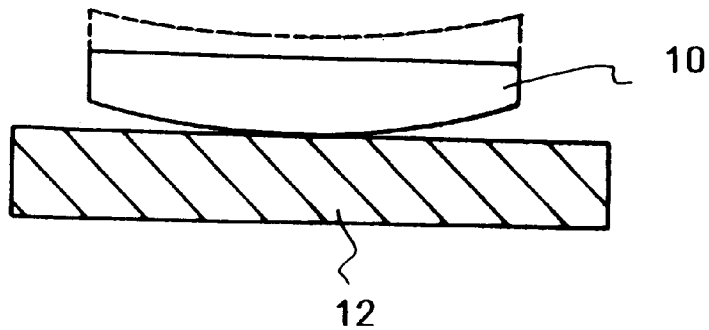

Next, the wafer 10, whose rear surface with the following grind, will be finished by another rotary grinding machine. FIG. 4 shows a summarized structure of the rotary grinding machine, whose shaft is horizontally arranged. In the rotary grinding machine, the wafer 10 to be machined is rotated, and a rotating face of a grind stone 40 is arranged parallel to the surface of the wafer 10 to be ground.

A symbol 34 stands for a chuck for holding the wafer 10, and a symbol 36 stands for a driving section. A structure of the chuck 34 is shown in FIG. 5. The chuck 34 draws the film face of the wafer 10 by air suction, so that the whole face of the wafer can be held. As shown in FIG. 5B, suction grooves 34a are coaxially formed in a suction face of the chuck 34, and the suction grooves are communicated to a center air suction hole 38 by communicating grooves so as to hold the wafer 10 parallel to the suction face of the chuck 34.

Since the whole suction face of the chuck 34 holds the wafer 10 by air suction, the warping of the wafer 10 can be straightened and the wafer 10 can be held parallel to the suction face of the chuck 34.

In the rotary grinding machine, the chuck 34 holds the wafer 10 by air suction, and the grind stone 40 is pressed onto the rotated wafer 10 so as to grind the wafer 10. In the present embodiment, the grind stone 40 is a cup-shaped grind stone. The cup-shaped grind stone is effective for surface grinding, and the rotary grinding machine is capable of uniformly grinding the entire wafer 10. In the present embodiment, the cup-shaped grind stone has a diameter of 150–200 mm, with diamond grains having diameters of 40–60 $\mu$m, rotated at rotational speed of 2,000–3,000 rpm so as to simultaneously grind the whole surface of the wafer 10. Since the amount of grinding is 0.03 mm, the amount of warping the wafer 10 could be reduced to half of the initial amount of warping. Further, the amount of warping the slider blocks, which had been cut from the wafer 10 whose amount of the warping had been reduced, could be reduced, so that the floating rails, which would be formed in disk-side faces of the slider blocks by patterning, could be formed in predetermined zones of the slider blocks.

In another case, the wafer 10 was ground by the cup-shaped grind stone including diamond grains, whose grain diameters were 10–20 $\mu$m. The amount of warping the ground wafer 10 is twice as large as the initial amount of warping. These results teach that the amount of warping the wafer 10 can be controlled by making the rear surface of the wafer 10 rough. Namely, stress in the rear surface of the wafer 10 can be controlled by making the rear surface of the wafer rough, so that the warping of the wafer 10 can be controlled. Minute spaces are formed among particles of $Al_2O_3.TiC$, which constitute the wafer 10. When the wafer 10 is ground, the minute spaces act to extend the rear surface of the wafer 10, so that stress between the film face and the rear surface is balanced. Further, in other case of grinding the wafer 10, the whole surface of the wafer 10 was ground, by surface grinding only, before cutting the slider blocks from the wafer 10.

Conditions of the surface grinding are the same as those of the former case. But, in the present case, the wafer 10, whose initial thickness was 2 mm, is ground until it reaches the thickness of 1.25 mm.

The grinding direction of the one sample wafer is perpendicular to the orientation flat, and the grinding direction of the other one is parallel thereto. The amount of warping the slider blocks, which had been cut from the wafers 10, is measured, and the amount of warping the wafer, which had been ground in the direction parallel to the orientation flat, is three times as large as the other wafer.

The slider blocks are cut, and their longitudinal directions are perpendicular to the orientation flat. The stress in the wafer 10 is released in the direction perpendicular to the grind traces, so the stress is released in the case of grinding the wafer in the direction perpendicular to the orientation flat and the amount of warping the slider blocks can be reduced.

The results also teach that the stress in the wafer and the warping of the slider blocks can be controlled by grinding the rear surface of the wafer. By adjusting the direction of the grind traces in the rear surface of the wafer 10, the amount and the direction of warping the wafer 10 can be controlled. In the case that the wafer 10 is cut in the prescribed direction so as to form the slider blocks, the direction must be defined with respect to the wafer 10. Accordingly, the direction of the grind traces is properly selected.

The method of roughly grinding the rear surface of the wafer 10 so as to control the warping of the wafer 10 may be employed in the steps of: cutting the wafer 10 to form the slider blocks after forming the films and forming the films on the wafer 10 by wafer process.

Figure 7:
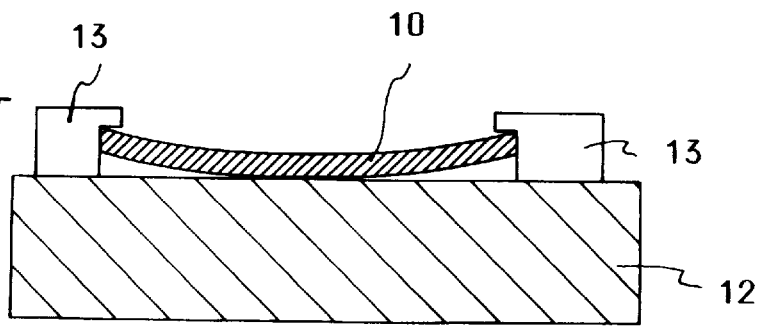
FIG. 7 is a sectional view of the conventional mechanical means for holding the wafer.
Figure 8:
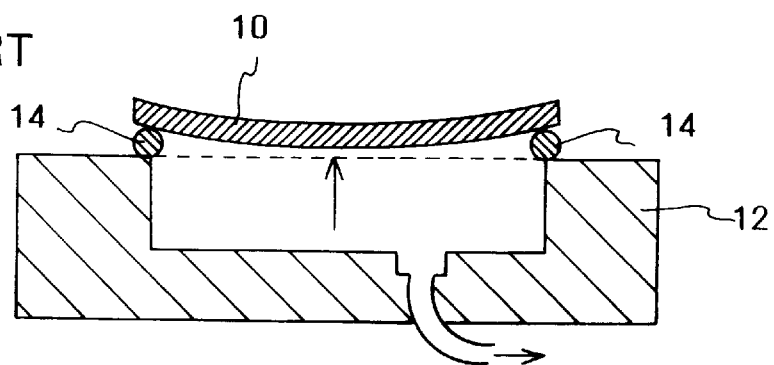
FIG. 8 is a sectional view of the conventional vacuum means for holding the wafer.
Figure 9:
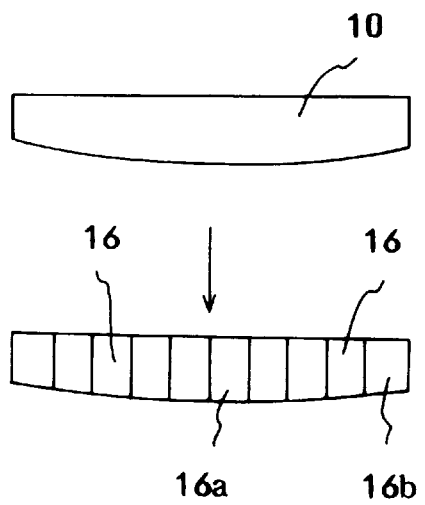
FIG. 9 shows the method for forming the sliders from the wafer.
Figure 10A:
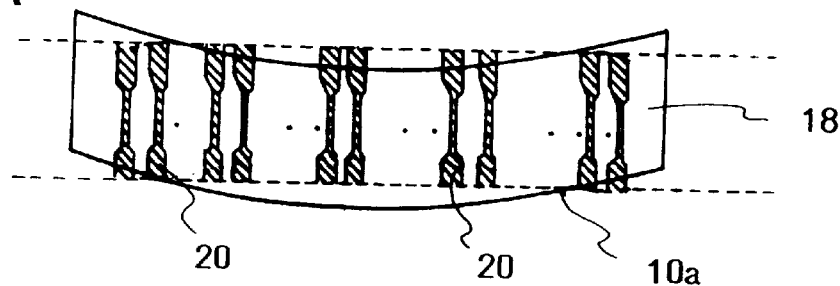
FIGS. 10A and 10B shows the methods of forming the floating rails on the warped slider and the straight slider.
Figure 10B:
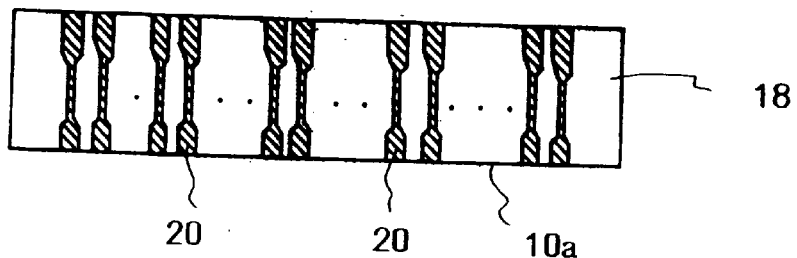
Figure 11A:
FIG. 11A is a side view of the slider block having the slope section.
Figure 11B:
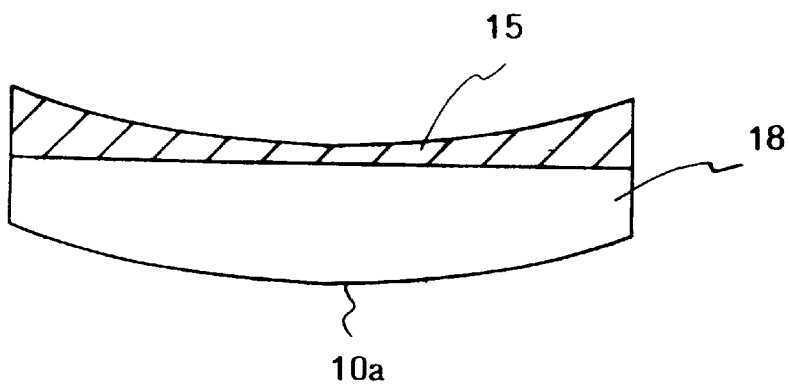
FIG. 11B shows the method for forming the slope section in the slider block.

In the wafer process, as well as the conventional method shown in FIG. 7, the wafer 10 is fixed to a jig, and patterns are formed by exposing step, etc.. If the wafer 10 is warped in the process, focusing accuracy in the exposing step must be low and the patterns having predetermined accuracy cannot be formed.

Further, in the wafer process, the wafer 10 is heated, so the wafer 10 must be cooled by a jig. But if the wafer 10 is warped, the wafer is not fully cooled and the films formed thereon are overheated, so that properties of the films are not satisfied.

Also, in the wafer process, the warping of the wafer 10 can be restricted by roughly grinding the rear surface of the wafer 10. If the wafer 10 can be ground during the wafer process, the grinding method may be executed. If the wafer cannot be ground, the rear surface may be roughly machined by ion milling or laser means. By forming the rough surface, the warping of the wafer 10 can be prevented and the wafer 10 can be correctly set in the jig, so that highly precise patterning can be executed and the films can have desired properties.

Note that, in the present embodiments, the rear surface of the wafer 10 is roughly machined by grinding, etc. Further, the front surface of the wafer 10, on which the films are formed, may be formed into a rough surface so as to control the warping of the wafer 10. The front surface of the wafer 10 may be formed into the rough surface in the step prior to the wafer process, or it may be formed into the rough surface, by ion milling, etc., during the wafer process. Forming the rough surface can prevent the warping of the whole wafer 10 and straighten partial waving and twisting thereof.

INDUSTRIAL APPLICABILITY

As described above, the method of the present invention can be applied to the step of grinding wafers for manufacturing magnetic heads of magnetic disk drive units, etc., and the method is capable of preventing the warping of the wafers and slider blocks, which are cut from the wafers.

What is claimed is:

1. A method of manufacturing a magnetic head comprising the step of linearly grinding a surface of a wafer, in which a plurality of magnetic head elements are formed on a substrate, wherein said linear grinding step results in grinding of substantially all of the surface being ground into a roughened surface such that warpage of the wafer is reduced.

2. The method according to claim 1 wherein said surface is ground by an outer circumferential face of a disk-shaped rotary grind stone.

3. The method according to claim 2 wherein width of the outer circumferential face of said disk-shaped rotary grind stone is 10 mm or more.

4. The method according to claim 1 wherein said surface, which has been linearly ground, is abraded in a circumferential direction.

5. The method according to claim 4 wherein said surface, which has been linearly ground, is abraded by a rotating face of a disk-shaped rotary grind stone.

6. The method according to claim 1 wherein said grinding surface is at a rear surface of the wafer, and the rear surface of the wafer is ground such that the stress between a front surface and the rear surface of the wafer is balanced.

7. The method according to claim 1 wherein said grinding step results in minute spaces being formed on the wafer, wherein said minute spaces extend the grind surface of the wafer such that warping of the wafer is reduced.

8. The method according to claim 1 wherein said grinding step results in linear grind traces in a predefined direction being marked on the surface of the wafer.

9. A method of manufacturing a magnetic head comprising the step of linearly grinding a surface of a wafer, in which a plurality of magnetic head elements are formed on a substrate, wherein said surface is ground in a direction parallel to a direction of cutting said wafer to form a plurality of blocks, in each of which a plurality of magnetic head elements are arranged.

10. A method of manufacturing a magnetic head comprising the steps of:

linearly grinding a rear surface of a wafer such that linear grind traces in a predefined direction are marked on the rear surface of the wafer; and, grinding the front surface of the wafer;

wherein said predefined direction allows the stress in the wafer to be released in the direction perpendicular to said grind traces during the step of grinding the front surface.

* * * * *